US011845606B2

(12) United States Patent
Saw

(10) Patent No.: US 11,845,606 B2
(45) Date of Patent: Dec. 19, 2023

(54) CONTAINER FOR AEROSOL SYSTEM

(71) Applicant: Boon Leong Saw, Negeri Sembilan (MY)

(72) Inventor: Boon Leong Saw, Negeri Sembilan (MY)

(*) Notice: Subject to any disclaimer, the term of this patent is extended or adjusted under 35 U.S.C. 154(b) by 378 days.

(21) Appl. No.: 16/614,313

(22) PCT Filed: Aug. 14, 2018

(86) PCT No.: PCT/MY2018/050053
§ 371 (c)(1),
(2) Date: Nov. 15, 2019

(87) PCT Pub. No.: WO2019/231312
PCT Pub. Date: Dec. 5, 2019

(65) Prior Publication Data
US 2020/0180850 A1 Jun. 11, 2020

(30) Foreign Application Priority Data

May 31, 2018 (MY) .......................... PI 2018702129

(51) Int. Cl.
| B65D 83/68 | (2006.01) |
| B65D 51/22 | (2006.01) |
| B65D 81/32 | (2006.01) |
| B65D 83/62 | (2006.01) |

(52) U.S. Cl.
CPC ......... *B65D 83/687* (2013.01); *B65D 51/227* (2013.01); *B65D 81/3238* (2013.01); *B65D 83/62* (2013.01)

(58) Field of Classification Search
CPC .. B65D 51/227; B65D 81/3238; B65D 83/62; B65D 83/687
See application file for complete search history.

(56) References Cited

U.S. PATENT DOCUMENTS

| 5,638,992 A * | 6/1997 | Lim ..................... B65D 83/687 |
| | | 222/402.1 |
| 2006/0201969 A1* | 9/2006 | Kwasny ................. B65D 83/42 |
| | | 222/135 |
| 2006/0219737 A1* | 10/2006 | Larkin .................. B01F 33/453 |
| | | 366/274 |

FOREIGN PATENT DOCUMENTS

| EP | 1 188 690 B1 | 4/2004 |
| JP | S60158073 A | 8/1985 |

* cited by examiner

*Primary Examiner* — Anthony D Stashick
*Assistant Examiner* — L Kmet
(74) *Attorney, Agent, or Firm* — Muncy, Geissler, Olds & Lowe, P.C.

(57) ABSTRACT

A cylindrical shaped container for aerosol system, having a body for housing a first component substances, a dome-shaped disk arranged at one end of the body; a mounting cup arranged at other end of the body to accommodate a first valve assembly, and an inner compartment joined hermetically to the first valve assembly. The inner compartment is positioned within the body for housing a second component substances. The second component substances are injected via the first valve assembly having a valve housing. The valve housing houses a bottom inner sleeve on one end of the valve housing, and a protrusion lever on the other end.

17 Claims, 5 Drawing Sheets

CONTAINER FOR AEROSOL SYSTEM

FIELD OF INVENTION

The present invention generally relates to an improvement of an aerosol spray can or container. In particular, the present invention describes formation and design of a cylindrical shaped aerosol spray can or container suitable for storing and discharging two-component (2K) sealing and insulating foams, 2K adhesives and 2K lacquers.

BACKGROUND ART

Pressurized can or container for two-component (2K) aerosol system has been introduced into the market as an improvement to the traditional one-component (1K) aerosol system. The 2K aerosol system has one obvious advantage over the traditional 1K aerosol system which is the delivery of reactive mixtures. Said reactive mixtures use low molecular weight monomer, oligomer, and functionalized low molecular polymer to make final cross-linked high molecular weight polymer. The 2K aerosol system is able to deliver high performance polymer products, such as curable paints and lacquers, sealing and insulating foams, as well as adhesives.

Compared to the 1K aerosol system, the pressurized can for 2K aerosol system contains an inner compartment for storing the second component of the reactive mixture. Main and second components are kept separated in pressurized can packaging to prevent the reactive mixture to quickly become unusable due to characteristic of the final cross-linked high molecular weight polymer that causes the mixture to set. In the field of automotive coatings, the liquid substances of the second component in the inner compartment of the pressurized can for 2K aerosol system is usually a hardener, catalyst or activator. Once the coating hardens, it is much less susceptible to damage due to chemicals, weather, or UV rays.

Activation of the 2K aerosol system is achieved by breaking the inner compartment of the pressurized can containing the second component to let the two reactive components mix in order to produce final product mixture, for use within a pre-determined pot life.

The current available pressurized can or container for 2K aerosol system consists of a complicated spring-mounted release mechanism arranged to break a diaphragm which seals the inner compartment when being activated, and to act on a tappet which in turn acts on the inner compartment's cover, splitting the cover open. However, said current available pressurized can for 2K aerosol system may result in leakage problem which is caused by rusting of the inner compartment. Further, filling of liquid substances and gas propellants in inner compartment and can body is only feasible during the assembly process of the pressurized can or container.

The present invention suggests a solution of the above problems by encountering the leakage and rusting problem of the inner compartment. Further, the present invention has improved on the sealing and activation mechanism of the pressurized container for 2K aerosol system by providing a simpler non-return protrusion valve assembly suitable for filling of liquid substances and gas propellants even after assembly of the pressurized container.

SUMMARY OF INVENTION

One embodiment of the present invention provides a cylindrical shaped container for aerosol system, comprising: a body for housing a first component substances; a dome-shaped disk arranged at one end of the body; a mounting cup arranged at other end of the body to accommodate a first valve assembly; an inner compartment joined hermetically to the first valve assembly; characterized in that, the inner compartment positioned within the body for housing a second component substances, wherein the second component substances injected via the first valve assembly having a valve housing wherein the valve housing houses a bottom inner sleeve on one end of the valve housing, and a protrusion lever on the other end, wherein the protrusion lever is connected via a sealing seat and a spring, in which during the second component substances injection, the second component substances travels through a channel of the bottom inner sleeve and pushes the sealing seat against the spring and away from the bottom inner sleeve, such that the second component substances are filled into the inner compartment via a passage located on at least one side of the valve housing.

Preferably, the container is a metal can or a storage receptacle.

Preferably, the passage located between the sealing seat and the bottom inner sleeve, in which the passage and the channel of the bottom inner sleeve are covered by the sealing seat before or after the second component substances are injected, by using the spring.

Preferably, the first valve assembly is used to puncture the inner compartment to release the second component substances into the body housing the first component substances to form a mixture of two-component aerosol system.

Preferably, the protrusion lever is used to puncture the inner compartment to release the second component substances into the body housing the first component substances to form a mixture of two-component aerosol system.

A further embodiment of the present invention includes an activator push knob having finger-like formation which acts as projection to push the sealing seat having the protrusion lever, such that the protrusion lever punctures the inner compartment.

Preferably, the activator push knob push the sealing seat from one end of the valve housing, and a protrusion lever to the other end to puncture the inner compartment, such that the second component substances propel into the body housing the first component substances.

Preferably, the inner compartment is a polytetrafluoroethylene (PTFE) tube, aluminium bag-on-valve pouch or expandable bag.

Preferably, the body and the inner compartment house gas propellants.

Preferably, the second component substances housed in the inner compartment is a hardener, catalyst or activator.

Preferably, the gas propellants housed in the inner compartment comprising compressed air or nitrogen gas, or combination thereof.

Preferably, the gas propellants housed in the body comprises of propane, butane, dimethyl ether (DME), methyl ethyl ether, nitrous oxide, carbon dioxide, or hydrofluoroalkanes (HFA), or any combinations thereof.

Preferably, the inner compartment assembled in such a way that the first valve assembly is used to allow filling and gassing by using a medium.

Preferably, the first valve assembly is made of a non-return valve.

Preferably, the dome-shaped disk arranged at one end of the body further comprising a top valve assembly to dispense the component substances in the body.

Preferably, the top valve assembly is made of an aerosol actuator to dispense the component substances in the body, and an aerosol dispensing valve which regulates, directs or controls flow of the component substances to the aerosol actuator.

Preferably, further comprising an overhead cap acts as a cover for the dome-shaped disk arrangement and undercap acts as a cover for the mounting cup arrangement.

The present invention may be embodied in other specific forms without departing from its essential characteristics. The described embodiments are to be considered in all respects only as illustrative and not restrictive. The scope of the invention is, therefore indicated by the appended claims rather than by the foregoing description. All changes, which come within the meaning and range of equivalency of the claims, are to be embraced within their scope.

BRIEF DESCRIPTION OF DRAWINGS

To further clarify various aspects of some embodiments of the present invention, a more particular description of the invention will be rendered by references to specific embodiments thereof, which are illustrated in the appended drawings. It is appreciated that these drawings depict only typical embodiments of the invention and are therefore not to be considered limiting of its scope. The invention will be described and explained with additional specificity and detail through the accompanying drawings in which.

DETAILED DESCRIPTION OF INVENTION

Figure 1B:
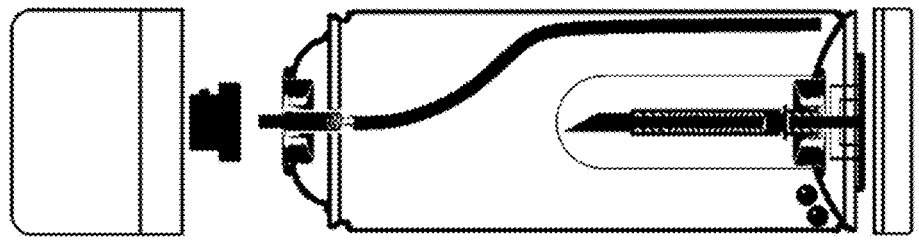
FIG. 1B illustrates partially exploded cross-section view of the cylindrical shaped container for aerosol system of the present invention.
Figure 1A:
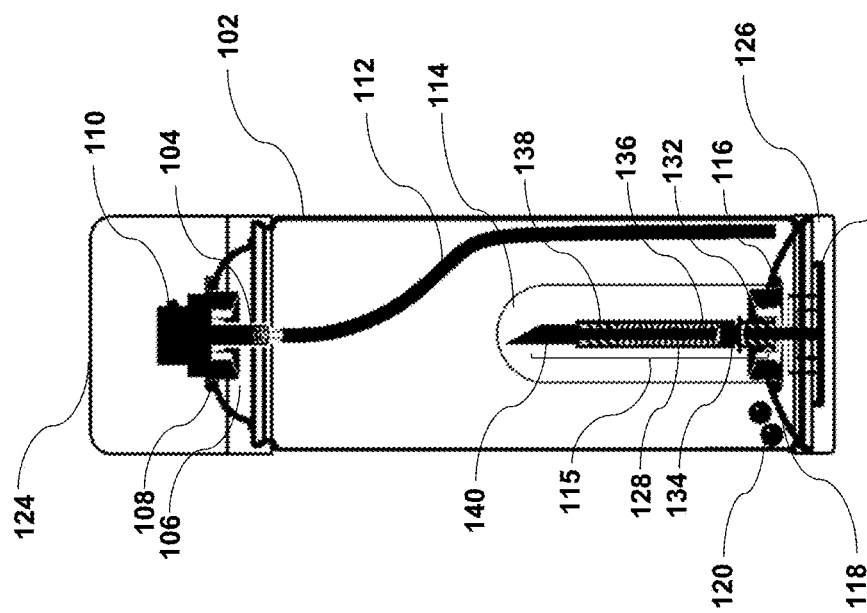
FIG. 1A illustrates an overall cross-section view of a cylindrical shaped container for aerosol system of the present invention.

The present invention relates to a can or container for two-component aerosol system. In particular, the present invention describes formation and design of a cylindrical shaped can or container for two-component aerosol system suitable for storing and discharging two-component (2K) sealing and insulating foams, 2K adhesives and 2K lacquers.

Hereinafter, the cylindrical shaped can or container for two-component aerosol system according to the present invention will be described in detail with reference to FIGS. 1A, 1B, and 2-5 according to the preferred embodiments. It is to be understood that limiting the description to the preferred embodiments of the invention is merely to facilitate discussion of the present invention and it is envisioned without departing from the scope of the appended claims.

The present invention discloses a preferred embodiment of a can or container for two-component (2K) aerosol system. According to FIGS. 1A and 1B, the can or container for two-component aerosol system (100) comprises of a cylindrical shaped body (102), aerosol dispensing valve (104) which regulates, directs or controls flow of the component substances, dome-shaped disk (106), valve cup or top valve assembly (108), valve actuator (110) to dispense the component substances in the body, feed pipe (112), inner compartment (114) arranged on the inside of said can, non-return protrusion valve assembly or first valve assembly (115), mounting cup (116), bottom dome (118), glass agitator beads (120), activator push knob (122), overcap (124) and undercap (126). The non-return protrusion valve assembly or first valve assembly (115) is arranged in a central longitudinal axis of the mounting cup (116) and comprises of a valve housing (128), bottom inner sleeve (132), sealing seat (134), spring (136), top inner sleeve (138) and protrusion lever (140).

As used hereinafter, the term "top part" denotes the end of a part of the can pointing towards the aerosol dispensing valve (104), and the term "bottom part" denotes the end of a part of the can pointing towards the bottom dome (118).

On the top part of the can, the can body (102) is crimped and sealed hermetically with a dome-shaped disk (106) by interlocked flanges. Valve cup or top valve assembly (108) is moulded on top of the dome-shaped disk (106) to accommodate aerosol dispensing valve (104) and valve actuator (110). The can body (102) may also be crimped and sealed directly to the valve cup or top valve assembly (108) which accommodates the aerosol dispensing valve (104) and the valve actuator (110). The cylindrical shaped can body (102) houses gas propellants and a first component liquid substances of the reactive mixture or final product. The gas propellants housed in the can body (102) can be comprised of propane, butane, dimethyl ether (DME), methyl ethyl ether, nitrous oxide, carbon dioxide, or hydrofluoroalkanes (HFA), or any combinations thereof.

On the bottom part of the can, a mounting cup (116) is attached and crimped hermetically to the can bottom dome (118) by interlocked flanges. The mounting cup (116) is preferably a standard cup (108) used at the top part of the can for the purpose of integrating the aerosol dispensing valve (104) into the dome-shaped disk (106) or directly into the can body (102). Such cups can be manufactured simply and at low cost, without separate fabrication from the cups used at the top part of the can. The non-return protrusion valve assembly or first valve assembly (115) is sealed hermetically to said mounting cup (116), by circumferential projection or groove of the mounting cup (116) providing a tight seal and improving seat of the non-return protrusion valve assembly or first valve assembly (115).

The cylindrical shaped can or container of the present invention is able to accommodate, in addition to the first component liquid substances in main chamber of the container body (102), a second component liquid substances in the inner compartment (114). When user activates the can by puncturing the inner compartment (114), the second component substances mixes and reacts with the first component substances to form a finished product. The can for 2K aerosol system has the advantage for delivery of reactive mixtures. As instance, 2K reactive mixture uses low molecular weight monomer, oligomer, and functionalized low molecular polymer to make final cross-linked high molecular weight polymer.

In the field of automotive coatings, the liquid substances of the second component in the inner compartment of the can for 2K aerosol system is usually a hardener, catalyst or activator. Once the coating hardens, it is much less susceptible to damage due to chemicals, weather, or UV rays. The finished product to be discharged by the can or container, may be two-component (2K) sealing and insulating foams, 2K adhesives or 2K lacquers.

Activation of the container is done by removing the undercap (126) before pressing the activator push knob (122) located at the bottom dome towards the top part of the can.

Figure 2:
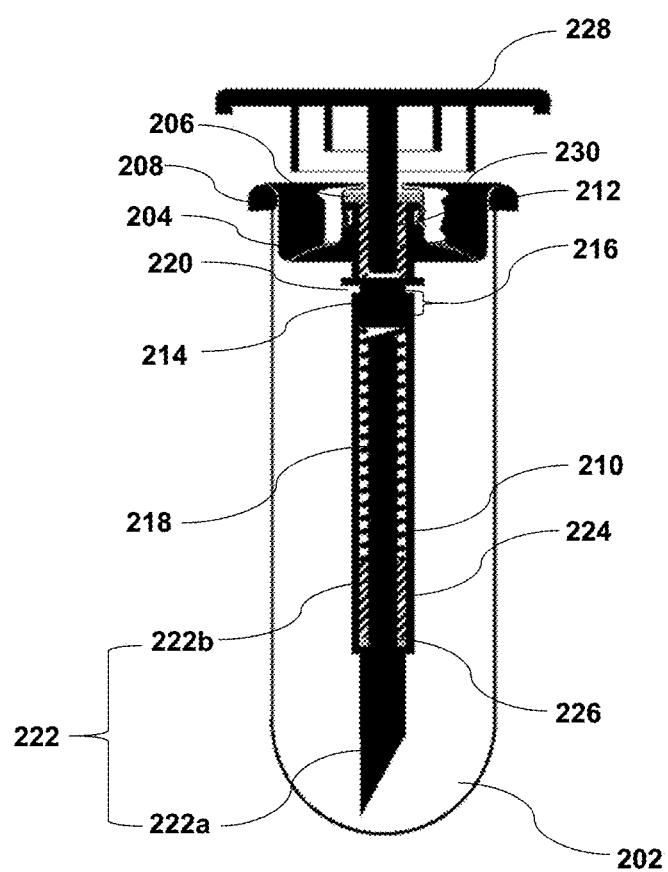
FIG. 2 illustrates an inverted view of a preferred embodiment of an inner compartment of the container for aerosol system of the present invention.

FIG. 2 illustrates an inverted view of the inner compartment of the can for two-component aerosol system (200) of the present invention. According to a preferred embodiment, polytetrafluoroethylene (PTFE) tube is used as an inner compartment (202). Other high-performance plastic variants such polypropylene are also suitable to be made into inner compartment (202), as well as puncturable metal material such as aluminium. The non-return protrusion valve assembly or first valve assembly is arranged in a central longitudinal axis inside the inner compartment (202), where the PTFE tube which serves as an inner compartment (202) has a cylinder shape with one closed end, and one open end attached hermetically with the mounting cup (204) by gluing, or welding, or threading or designed so to be integral with the mounting cup forming a single piece. Preferably, the closed end of the PTFE tube is a round end. The non-return protrusion valve assembly is sealed hermetically to said mounting cup (204) by circumferential projection or groove of the mounting cup (204) improving seat of the non-return protrusion valve assembly or first valve assembly and providing a tight seal with the aid of an inner gasket (206). The mounting cup (204) is attached and crimped hermetically to the can bottom dome by interlocked flanges and mounting gasket (208).

A valve housing (210) accommodates bottom inner sleeve (212) which is arranged to be fixed to the inner wall of the valve housing (210), and acts as a stopper or abutment for the sealing seat (214) as shown in FIG. 2. The sealing seat (214) is arranged so to provide a tight seal for the inner compartment (202) with the aid of O-rings (216) located on both ends of the sealing seat (214).

In addition to the liquid substances of second component, the inner compartment (202) is filled with nitrogen as a dehumidifier agent to the second component. With nitrogen gas, shelf life of second component may be extended significantly due to minimal moisture content.

As shown in FIG. 2, spring (218) is directly coupled with the sealing seat (214). In order to accommodate access of the liquid substances of second component and gas propellants into the inner compartment (202), at least one passage (220) is provided. It is to be understood that the length of displacement of the sealing seat (214) during filling process is able to be absorbed by the spring (218), without moving the protrusion lever (222) which is arranged on the other end of the spring (218). This is due to the gap between the sealing seat (214) and the protrusion lever (222), which allows for the displacement of the sealing seat (214) to be absorbed by the spring (218) without pushing the protrusion lever (222). The passage (220) provides the quickest relief of the gas and liquid substances after entrance into the valve housing (210).

The top inner sleeve (224) acts as a stopper or abutment for the spring (218), to keep the spring (218) pushing the sealing seat (214) in place, closing the passage (220) at all times except during filling process. The protrusion lever (222) arranged on the other end of the spring (218) is sealed from the content of the inner compartment (202) by lever O-ring (226). The lever O-ring (226) prevents the liquid substances of second component from entering the valve housing (210) to avoid wastage of the second component liquid substances.

Referring to FIG. 2, the protrusion lever (222) is made up of two sections; head section (222a) and tail section (222b). The head section (222a) is arranged to be protruding outside of the valve housing (210), and the tail section (222b) is arranged inside of the valve housing (210) in a slidable manner. However, the head section (222a) is of a larger diameter than the tail section (222b), to only allow the protrusion lever (222) to slide out of the valve housing (210) and prevent it from sliding inwards due to smaller diameter opening of the valve housing (210) at the top part end. The head section (222a) is arranged to be facing the inner compartment (202) closed end. The original position of the protrusion lever (222) before activation is maintained by the top inner sleeve (224). The head section of the protrusion lever (222a) as disclosed in the preferred embodiment is designed in a shape of a sloped and sharp-edged hollow cylinder at the top part to provide it with a pointed tip in order to facilitate tearing and puncturing of the inner compartment (202).

Figure 3:
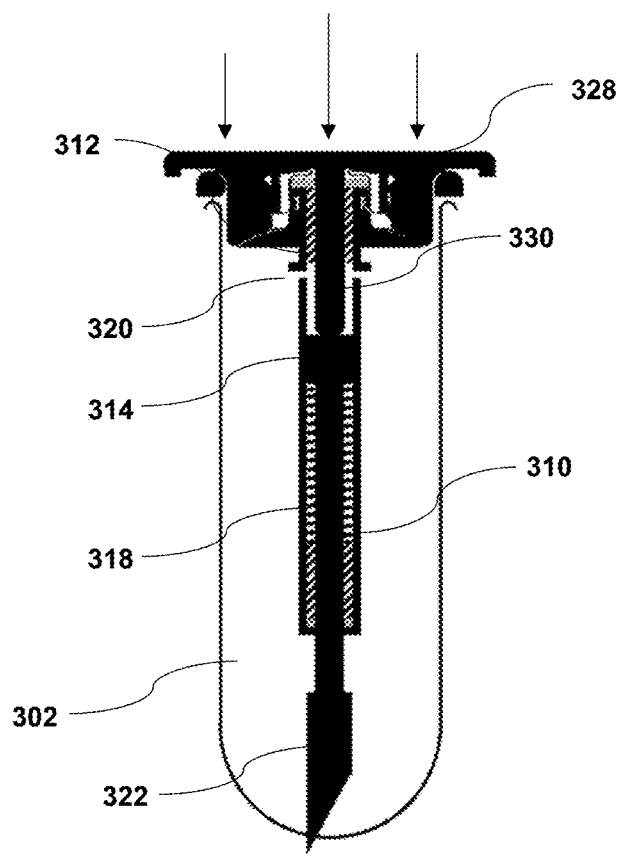
FIG. 3 illustrates an arrangement of the inner compartment during activation of the container for aerosol system of the present invention.

Activation of the can or container as disclosed in the present invention is done by removing the undercap before pressing the activator push knob (328) located at the bottom dome towards the top part of the container as shown by the direction of arrow in FIG. 3 in order to puncture the inner compartment (302). Said activator push knob (328) having a finger-like formation (330) is able to be slotted into a channel of the bottom inner sleeve (312).

Force is applied on the activator push knob (328), with the finger-like formation (330) slotted into the channel of the bottom inner sleeve (312) to push the sealing seat (314). This action will cause the said sealing seat (314) to compress the spring (318) before further pushing the protrusion lever (322) towards the top part of the can to puncture the inner compartment (302). It is to be understood that the length of the finger-like formation (330) reflects the displacement distance required by the activation mechanism. Displacement of said sealing seat (314) during activation of the can will not cause unsealing of the passage (320). Sealing of the passage (320) during activation will be replaced by the finger-like formation (330) of the activator push knob (328) as shown in FIG. 3.

When a user activates the can or container by puncturing the inner compartment of FIG. 3, the nitrogen gas will propel the liquid substances of the second component into the main chamber of the container body so that the second component mixes and reacts with the main component to form a finished product. If necessary, shaking motion is applied on the container to further homogenize the mixture, with the aid of the glass agitator beads.

Figure 4:
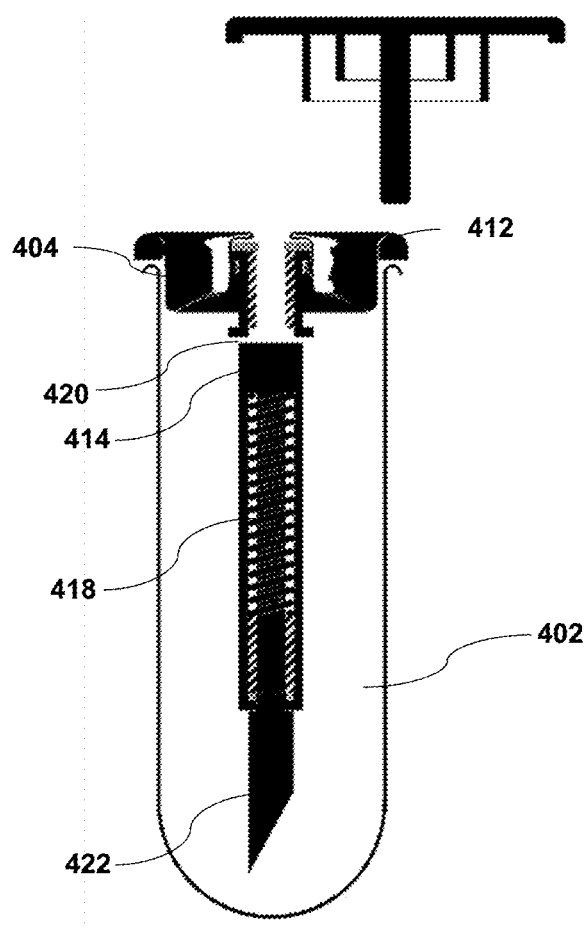
FIG. 4 illustrates an arrangement of the inner compartment during injection or filling process of said inner compartment.

FIG. 4 illustrates an arrangement of the inner compartment during injection or filling process of the container for two-component aerosol system (400). To accommodate access of the liquid substances of second component and gas propellants through a channel of the bottom inner sleeve (412) and into the inner compartment (402), a passage (420) is provided. During the filling process of the nitrogen gas and the liquid substances of the second component, the pressure that is applied to fill the inner compartment will push the sealing seat (414) away from the bottom inner sleeve (412). Said displacement of the sealing seat (414) will unseal the passage (420) for filling process. It is to be understood that the length of displacement of the sealing seat (414) during filling process is able to be absorbed by the spring (418), without moving the protrusion lever (422) which is arranged on the other end of the spring (418) as shown in FIG. 4.

Figure 5:
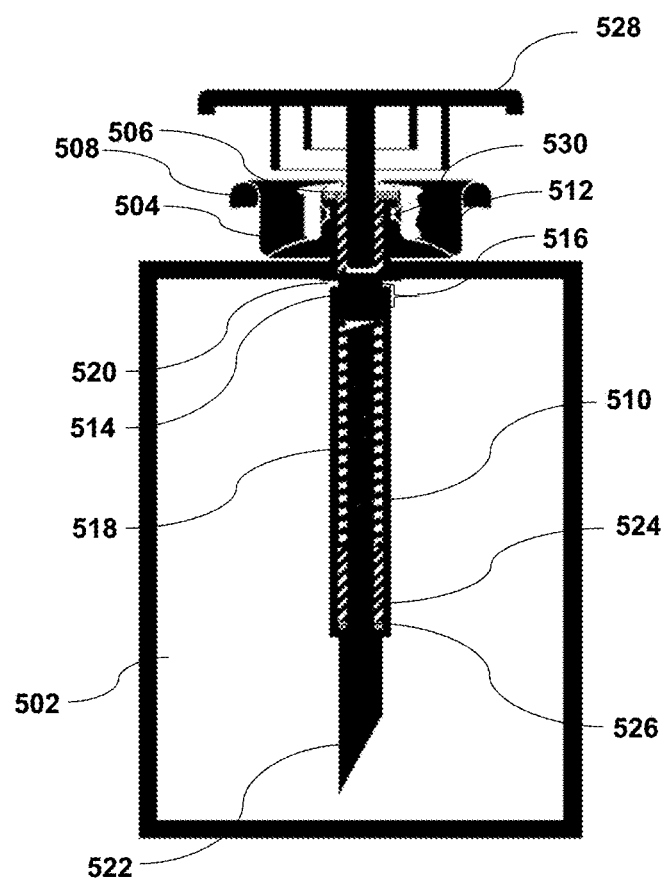
FIG. 5 illustrates an inverted view of an alternative embodiment of the inner compartment of the container for aerosol system of the present invention.

FIG. 5 illustrates an alternative embodiment of the inner compartment of the present invention (500). In this embodiment, aluminium BoV pouch is used as an inner compartment (502) to house liquid substances of the second component of the final product mixture. Further, the aluminium BoV pouch is charged with nitrogen gas as a dehumidifier agent to the second component. With nitrogen gas, shelf life of second component may be extended significantly with minimal moisture content. Gas propellants of the main chamber of the can body will further propel the liquid substances of the second component inside the flexible bag-on-valve inner compartment (502), such that the second component substances are filled into the main chamber of container body through the opening on the inner compartment (502) created by puncturing the inner compartment during can activation.

It is known to those skilled in the art, that aluminium bag-on-valve pouches are customarily used in one-component (1K) aerosol can to separate aerosol product from the gas propellants, housing it in a flexible multilayer laminated bag, usually opaque silver in colour and made from layers of nylon, polyethylene and aluminium. The aluminium BoV pouches are made from relatively flexible material that can be rolled or folded to be easily inserted into an aerosol can body opening. The bag-on-valve pouch is welded hermetically to the aerosol dispensing valve which is crimped to the valve cup or directly to the can body. By keeping the product separate from propellants at all times, integrity of the product can be ensured. This feature is especially important for clean room production, food and medical products. As aluminium is recyclable, it is also more beneficial for the environment.

Due to the way that the non-return protrusion valve assembly or first valve assembly is designed, both embodiments of the inner compartment as shown in FIGS. 2 and 5 allows filling and gassing after being attached hermetically to the mounting cup (204, 504) at the bottom part of the can body.

Unless the context requires otherwise or specifically states to the contrary, integers, steps or elements of the invention recited herein as singular integers, steps, or elements clearly encompass both singular and plural forms of the recited integers, steps or elements.

Throughout this specification, unless the context requires otherwise, the word "comprise", or variations such as "comprises" or "comprising", will be understood to imply the inclusion of a stated step or element or integer or group of steps or elements or elements or integers, but not the exclusion of any other step or element or integer or group of steps, elements or integers. Thus, in the context of this specification, the term "comprising" is used in an inclusive sense and thus should be understood as meaning "including principally, but not necessarily solely".

The invention claimed is:

1. A cylindrical shaped container for an aerosol system, comprising:
    a body having a main chamber for housing a first component substance;
    a dome-shaped disk arranged at one end of the body;
    a mounting cup arranged at another end of the body to accommodate a first valve assembly;
    an inner compartment joined hermetically to the first valve assembly;
    wherein, the inner compartment is positioned within the body for housing a second component substance injected via the first valve assembly,
    wherein the first valve assembly includes a valve housing, a bottom inner sleeve and a sealing seat, the valve housing houses the bottom inner sleeve on one end of the valve housing, and the valve housing houses a protrusion lever on the other end of the valve housing,
    wherein the protrusion lever is connected to the sealing seat via a spring,
    wherein the first valve assembly includes O-rings on both ends of the sealing seat to provide a tight seal for the inner compartment,
    wherein the first valve assembly includes a lever O-ring deposited at the other end of the valve housing to prevent the second component substance in the inner compartment from entering the valve housing via the other end of the valve housing,
    in which during the second component substance injection into the inner compartment, the second component substance travels through a channel of the bottom inner sleeve and pushes the sealing seat against the spring and away from the bottom inner sleeve,
    wherein a passage is provided on at least one side of the valve housing, wherein the passage is located between the sealing seat and the bottom inner sleeve, to facilitate filling of the second component substance through a channel of the bottom inner sleeve to the inner compartment.

2. The cylindrical shaped container for an aerosol system as claimed in claim 1, wherein the container is a metal can or a storage receptacle.

3. The cylindrical shaped container for an aerosol system as claimed in claim 1, wherein the passage is located between the sealing seat and the bottom inner sleeve, in which the passage and the channel of the bottom inner sleeve are covered by the sealing seat before or after the second component substance are injected, by using the spring.

4. The cylindrical shaped container for an aerosol system as claimed in claim 1, wherein the first valve assembly is used to puncture the inner compartment to release the second component substance into the body housing the first component substance to form a mixture of two-component aerosol system.

5. The cylindrical shaped container for an aerosol system as claimed in claim 1, wherein the protrusion lever is used to puncture the inner compartment to release the second component substance into the body housing the first component substance to form a mixture of two-component aerosol system.

6. The cylindrical shaped container for an aerosol system as claimed in claim 1, further including an activator push knob having a finger-like formation which acts as a projection to push the sealing seat having the protrusion lever, such that the protrusion lever punctures the inner compartment.

7. The cylindrical shaped container for an aerosol system as claimed in claim 6, wherein the activator push knob pushes the sealing seat from one end of the valve housing, and a protrusion lever to the other end to puncture the inner compartment, such that the second component substance propel into the body housing the first component substance.

8. The cylindrical shaped container for an aerosol system as claimed in claim 1, wherein the inner compartment is a polytetrafluoroethylene (PTFE) tube, aluminium bag-on-valve pouch or expandable bag.

9. The cylindrical shaped container for an aerosol system as claimed in claim 1, wherein the body and the inner compartment house gas propellants.

10. The cylindrical shaped container for an aerosol system as claimed in claim 1, wherein the second component substance housed in the inner compartment is a hardener, catalyst or activator.

11. The cylindrical shaped container for an aerosol system as claimed in claim 9, wherein the gas propellants housed in the inner compartment are selected from the group consisting of compressed air or nitrogen gas, or a combination thereof.

12. The cylindrical shaped container for an aerosol system as claimed in claim 9, wherein the gas propellants housed in the body are selected from the group consisting of propane, butane, dimethyl ether (DME), methyl ethyl ether, nitrous oxide, carbon dioxide, or hydrofluoroalkanes (HFA), or any combinations thereof.

13. The cylindrical shaped container for an aerosol system as claimed in claim 1, wherein the inner compartment is assembled in such a way that the first valve assembly is used to allow filling and gassing by using gas propellants.

14. The cylindrical shaped container for an aerosol system as claimed in claim 1, wherein the first valve assembly is made of a non-return valve.

15. The cylindrical shaped container for an aerosol system as claimed in claim 1, wherein the dome-shaped disk is arranged at one end of the body, further comprising a top valve assembly to dispense the component substances in the body.

16. The cylindrical shaped container for an aerosol system as claimed in claim 15, wherein the top valve assembly is made of an aerosol actuator to dispense the component substances in the body, and an aerosol dispensing valve which regulates, directs or controls flow of the component substances to the aerosol actuator.

17. The cylindrical shaped container for an aerosol system as claimed in claim 1, further comprising an overhead cap acting as a cover for the dome-shaped disk arrangement and an undercap acting as a cover for the mounting cup arrangement.

* * * * *